US012084220B2

(12) United States Patent
Groholski

(10) Patent No.: US 12,084,220 B2
(45) Date of Patent: Sep. 10, 2024

(54) LABEL DRUM CALIBRATION SYSTEM

(71) Applicant: AMTIG ENGINEERING SOLUTIONS, LLC, Quincy, MI (US)

(72) Inventor: Steven Groholski, Quincy, MI (US)

(73) Assignee: AMTIG ENGINEERING SOLUTIONS, LLC, Quincy, MI (US)

(*) Notice: Subject to any disclaimer, the term of this patent is extended or adjusted under 35 U.S.C. 154(b) by 0 days.

(21) Appl. No.: 17/583,864

(22) Filed: Jan. 25, 2022

(65) Prior Publication Data

US 2023/0234743 A1 Jul. 27, 2023

(51) Int. Cl.
*B65C 9/40* (2006.01)
*B65C 9/30* (2006.01)

(52) U.S. Cl.
CPC . *B65C 9/40* (2013.01); *B65C 9/30* (2013.01)

(58) Field of Classification Search
CPC .......... B65C 9/188; B65C 9/40; G01B 21/047
See application file for complete search history.

(56) References Cited

U.S. PATENT DOCUMENTS 4,813,844 A * 3/1989 Torii ...................... B25J 9/1692 414/730
5,116,452 A 5/1992 Eder
6,328,832 B1 12/2001 Otruba et al.
8,066,046 B2 11/2011 Ballarotti
8,408,267 B2 4/2013 Hafner et al.
8,485,240 B2 7/2013 Schinelli
2017/0166344 A1* 6/2017 Carmichael ........... B65C 9/2247

FOREIGN PATENT DOCUMENTS

CN 104340447 A 2/2015
DE 3734365 * 12/1988 ........... G01R 19/145

* cited by examiner

*Primary Examiner* — Michael N Orlando
*Assistant Examiner* — John Blades
(74) *Attorney, Agent, or Firm* — FLYNN THIEL, P.C.

(57) ABSTRACT

A label vacuum-grip cylinder calibration system comprising an indicator support holder supporting a first indicator and a second indicator. The indicators each have a display face with a display. Projection areas of the display faces project perpendicularly from the display faces. The indicator support holder supports the first indicator and the second indicator such that a first projection area and a second projection area do not overlap and neither the first indicator nor the second indicator obscures either display.

15 Claims, 13 Drawing Sheets

LABEL DRUM CALIBRATION SYSTEM

FIELD OF THE INVENTION

The present invention relates to bottling, and in particular to an improved label holder.

BACKGROUND OF THE INVENTION

Conveyor systems have been developed for quickly filling and capping a multitude of containers (e.g., bottles) in a very short period of time. The conveyor systems move empty containers (and uncapped if bottles) along a line and/or along a periphery of a wheel and fill the containers (with, for example, water, soda or any other liquid), close or cap the containers while the containers continuously move, and apply labels to the containers.

FIG. 1 illustrates a schematic portion of a container filling and labeling system 10 showing a schematic portion of a container labeling area 12. In the container labeling area 12, individual labels 14 from a single sheet of multiple labels 16 are applied to individual containers 18 (bottles as shown). As shown in FIG. 1, the single sheet of multiple labels 16 enters the illustrated container labeling area 12 for applying the labels 14 to the containers 18. The single sheet of multiple labels 16 can come from a label reel (not shown). As the single sheet of multiple labels 16 passes through the container labeling area 12, the single sheet of multiple labels 16 passes around a guide roller 20, through a pair of feed rollers 22, and onto a cutting unit 24. The cutting unit 24 cuts the single sheet of multiple labels 16 into the individual labels 14 while positioning the individual labels 14 onto a vacuum-grip cylinder 26. The vacuum-grip cylinder 26 passes the individual labels 14 over a hotmelt gluing unit 28 that applies hotmelt glue to a rear side of the individual labels 14 suctioned to the vacuum-grip cylinder 26. The containers 18 are positioned adjacent an outside of a container table 30. As shown in FIG. 1, the containers 18 are spun such that the rear side of the individual labels 14 that are brushed against the exterior of the containers 18 are adhered to the exterior of the containers 18.

In the prior art, the vacuum-grip cylinder 26 included various cylinders that were capable of holding the individual labels 14 via vacuum, allowing the glue to be applied to the rear side of the individual labels 14 suctioned to the vacuum-grip cylinder 26, and allowing the individual labels 14 to be applied to a cylindrical surface of the containers 18. An example of such a vacuum-grip cylinder 26 is disclosed in U.S. Pat. No. 8,408,267 entitled VACUUM CYLINDER FOR A LABELING APPARATUS, the entire contents of which are hereby incorporated herein by reference. The vacuum-grip cylinder 26 of U.S. Pat. No. 8,408,267 is illustrated in FIGS. 2-5.

FIG. 2 shows a perspective oblique view of vacuum-grip cylinder 26 of U.S. Pat. No. 8,408,267. The vacuum-grip cylinder 26 comprises a bottom support 32, although this is largely hidden in FIG. 2. The bottom support 32 is of rotationally symmetrical design and has a plurality of webs 34 extending in the radial direction. Cutouts 36 are provided between the individual webs 34. Supporting elements 38 connect the bottom support 32 to an upper support 40. The longitudinal direction L of the supporting elements 38 is perpendicular to the plane of the bottom support 32.

In FIG. 3, the plane of the bottom support 32 runs in the plane of the figure, and the longitudinal direction L of the supporting elements 38 is perpendicular thereto. The supporting elements 38 or the first end sections 38*a* thereof are releasably connected to the bottom support 32 via screw connections. Due to this releasability, a replacement of the individual supporting elements 38 and also a displacement of the supporting elements 38 in the circumferential direction of the vacuum-grip cylinder 26 is possible in a relatively simple manner. A hub 42 of the vacuum-grip cylinder 26 receives a rotating shaft (not shown) for rotating the vacuum-grip cylinder 26. A lower portion of the hub 42 is screwed to the bottom support 32 by a plurality of screw connections 44. The bottom support 32 has a ring 46 running in the circumferential direction and the individual supporting elements 38 are fixed thereto. The upper support 40 is designed in essentially the same way as the bottom support 32. Therefore, the upper support 40 also has a plurality of webs 48, between which respective cutouts 50 are arranged.

The individual supporting elements 38 or the upper end sections 38*b* thereof are connected to one another by a fixing ring 52. The upper support 40 likewise has a receiving opening 54 for receiving the shaft. A hub 56 of the upper support 40 is fixed to the fixing ring 58 by a plurality of screws 60.

The fixing of the supporting elements 38 to the bottom support 32 and the upper support 40 takes place via a plurality of screw connections 62. Suction strips 64*a*, 64*b* hold the start of an individual label 14 and the end of the individual label 14 to the vacuum-grip cylinder 26 by suction. In the embodiment shown in FIGS. 2-5, a total of twelve such suction strips 64*a*, 64*b* are provided. During operation, the start of an individual label 14 suctioned to the vacuum-grip cylinder 26 is arranged at the suction strips 64*a* and the end of the individual label 14 is arranged at the suction strips 64*b*. Segments 66 are provided in the circumferential direction between the suction strips 64*a*, 64*b*. The segments 66 are connected both to the bottom support 32 and also to the upper support 40 via a plurality of screw connections 68. The segments 66 have a plurality of suction openings 70 for air, which are arranged in suction rows. An opening 72 elongated in the circumferential direction of the segment 66 serves for optical monitoring of the presence of the individual labels 14 during operation. Located radially behind the suction openings 70 are vacuum chambers 74, which are connected to central suction points 76 (also shown in FIG. 3) via first vacuum lines 78. Openings 80 for sucking air are also provided in the suction strips 64*a*, 64*b*.

FIG. 3 shows a plan view of the vacuum-grip cylinder 26 from FIG. 2. Both the bottom support 32 and the upper support 40 have recesses 82*a*, 82*b*, in which the individual suction strips 64*a*, 64*b* are arranged. The respective second recesses 82*b* in the circumferential direction are wider than the width of the suction strips 64*a*, 64*b* in the circumferential direction. In this way, the suction strips 64*a*, 64*b* can be moved in the circumferential direction. A certain degree of adaptation to different labels and machine types can thus take place.

A quick-clamping ring 84 has a protrusion 86, through the displacement of which allows for release of the individual suction strips 64*a*, 64*b* for movement thereof. More specifically, once the quick-clamping ring 84 has been opened, the individual suction strips 64*a*, 64*b* can be removed from the vacuum-grip cylinder 26 in a direction perpendicular to the plane of the figure. The suction strips 64*a*, 64*b* in each case have an angled surface 88 which points in the direction of the segments 66. The individual angled surfaces 88 also protrude slightly beyond the circumference of the vacuum-grip cylinder 26 or the two supports 32 and 40 and also the segments 66, which allows for sucking up the individual labels 14 and prevents corrugations of the individual labels

14. The supporting elements 38 in each case have receiving grooves 90 for receiving the suction strips 64*a*, 64*b*.

FIG. 4 shows the vacuum-grip cylinder 26 wherein the individual suction strips 64*a*, 64*b* are not yet pushed fully into the vacuum-grip cylinder 26 in the longitudinal direction L. In an inner side of the suction strips 64*a*, 64*b* (i.e., the side pointing radially inwards), the suction strips 64*a*, 64*b* have a depression 92, in which a flexible material 94 (FIG. 4) can be inserted, such as for example a piece of foam. In this way, the suction strips 64*a*, 64*b* can be moved slightly relative to the bottom support 32 and also the upper support 40 in the direction R and in the direction opposite thereto.

The quick-clamping ring 84 allows for the lock between the suction strips 64*a*, 64*b* and the supporting element 38 to be opened and in this way the suction strips 64*a*, 64*b* can easily be removed. The supporting element 38 has a rear wall 96, in which two openings are provided for the insertion of the first vacuum lines 78. The first vacuum lines 78 are connected to the rear wall 96 via the connecting pieces 98. In the embodiment shown here, the suction strips 64*a*, 64*b* are supplied by two first vacuum lines 78, while the vacuum chambers 74 behind the segments 66 are supplied by a second vacuum line 100. However, the number of these first vacuum lines 78 and second vacuum lines 100 can also be varied.

FIG. 5 shows a detail view of the diagram from FIG. 4. The flexible material 94 allows a movement of the suction strips 64*a*, 64*b* relative to the supporting elements 38 and thus relative to the bottom support 32 and also the upper support 40. Both the suction strips 64*a*, 64*b* and also the segments 66 are provided with an anti-adhesion coating or traction coating.

When using the container filling and labeling system 10 of the prior art having the container labeling area 12, the positioning of the suction strips 64*a*, 64*b* relative to the rest of the vacuum-grip cylinder 26 is very important. As outlined above, the suction strips 64*a*, 64*b* can be moved slightly relative to the bottom support 32 and also the upper support 40 in the direction R and in the direction opposite thereto. The suction strips 64*a*, 64*b* need to be positioned close enough to the hotmelt gluing unit 28 as the suction strips 64*a*, 64*b* are rotated past the hotmelt gluing unit 28 to be able to apply a sufficient amount of hotmelt glue to the rear side of the individual labels 14 suctioned to the vacuum-grip cylinder 26 without abutting the hotmelt gluing unit 28 as the suction strips 64*a*, 64*b* pass by the hotmelt gluing unit 28. As the size and location of the hotmelt gluing unit 28 and the containers 18 can vary, a system for properly positioning the suction strips 64*a*, 64*b* before use of the container filling and labeling system 10 is needed.

FIGS. 6 and 7 illustrate a first prior art positioning system 102. The first prior art positioning system 102, a pair of indicators 104 including an upper indicator 104*a* and a lower indicator 104*b* are used to properly position each of the suction strips 64*a*, 64*b*. Each of the indicators 104 include a display housing 106 having a shaft housing 108 extending from a perimeter thereof. A probe shaft 110 extends from the shaft housing 108. As is well known to those skilled in the art, the display housing 106 and the shaft housing 108 are kept stationary and an object is moved against the probe shaft 110 to measure a distance travelled by the probe shaft 110. The display housing 106 can be analog or digital as is well known to those skilled in the art.

The first prior art positioning system 102 includes the vacuum-grip cylinder 26 on a central rotating shaft 112 extending vertically from a support surface 114 and an indicator support shaft 116 extending vertically from the support surface 114 substantially parallel to the central rotating shaft 112. The indicator support shaft 116 includes a pair of openings 118 receiving the shaft housing 108 therein. As shown in FIG. 7, the probe shafts 110 of the upper indicator 104*a* and the lower indicator 104*b* abut against the suction strips 64*a*, 64*b* as the suction strips 64*a*, 64*b* are rotated past the probe shafts 110. If the suction strips 64*a*, 64*b* extend too far out or not far enough out from the vacuum-grip cylinder 26 as measured by the pair of indicators 104 to have an appropriate amount of hotmelt glue placed on labels 14 suctioned thereto, the position of the suction strips 64*a*, 64*b* can be altered as outlined above and as known to those skilled in the art. Having the upper indicator 104*a* and the lower indicator 104*b* allows for the face of the suction strips 64*a*, 64*b* to be on a proper plane. In the first prior art positioning system 102, the height of the upper indicator 104*a* and the lower indicator 104*b* are fixed as the indicator support shaft 116 has fixed openings therein that are not vertically adjustable.

FIGS. 8 and 9 illustrate a second prior art positioning system 120. The second prior art positioning system 120 includes the pair of indicators 104 including the upper indicator 104*a* and the lower indicator 104*b*, which are used to properly position each of the suction strips 64*a*, 64*b*. The second prior art positioning system 120 includes an indicator holder 122 as shown in FIGS. 10-13. The second prior art positioning system 120 includes a pair of indicator holders 122 each connected to an indicator holder support shaft 124 extending vertically from a support surface 126 substantially parallel to a central rotating shaft 128 rotatably holding the vacuum-grip cylinder 26. Like the first prior art positioning system 102, the second prior art positioning system 120, the probe shafts 110 of the upper indicator 104*a* and the lower indicator 104*b* abut against the suction strips 64*a*, 64*b* as the suction strips 64*a*, 64*b* are rotated past the probe shafts 110. If the suction strips 64*a*, 64*b* extend too far out or not far enough out from the vacuum-grip cylinder 26 as measured by the pair of indicators 104 to have an appropriate amount of hotmelt glue placed on labels 14 suctioned thereto, the position of the suction strips 64*a*, 64*b* can be altered as outlined above and as known to those skilled in the art. Having the upper indicator 104*a* and the lower indicator 104*b* allows for the face of the suction strips 64*a*, 64*b* to be on a proper plane.

FIGS. 10-12 illustrate the prior art indicator holder 122. The indicator holder 122 includes a block 130 having a holding arm 132 extending laterally therefrom. The block 130 includes a center opening 134 for accepting the indicator holder support shaft 124 therethrough. An end of the block 130 opposite the holding arm 132 includes a slot 136 extending from an end 138 of the block 130 to the center opening 134. A fastener (not shown) can be inserted through a hole 139 between a pair of legs 140 to allow for the legs 140 to be pulled toward each other to make the center opening 134 smaller to lock the indicator holder 122 to the indicator holder support shaft 124. The holding arm 132 includes a vertical hole 142, a horizontal hole 144 and a slot 146 ending from an end of the holding arm 132 to the horizontal hole 144. The horizontal hole 144 is configured to accept the shaft housing 108 of the indicators 104 and a fastener (not shown) is configured to be inserted into the vertical hole 142 to make the horizontal hole 144 smaller in order to secure the shaft housing 108 to the indicator holder 122.

Since the container filling and labeling system 10 works continuously, any shutdown or slowdown of the container filling and labeling system 10 can prevent thousands of containers from being ready for shipping, costing the factories large amounts of money. Therefore, there is a desire to prevent and/or lessen the shutdown or slowdown time of container filling and labeling systems 10. In the positioning systems of the prior art, the measurements taken by the indicators can be difficult to read. If the measurements are difficult to read, it is possible that the time needed to properly align the suction strips 64*a*, 64*b* on the vacuum-grip cylinder 26 can be too long and/or the suction strips 64*a*, 64*b* might not be properly positioned on the vacuum-grip cylinder 26. Therefore, a system to quickly and easily read the indicators 104 is desired.

SUMMARY OF THE INVENTION

The present invention, according to one aspect, is directed to a method of calibrating a label vacuum-grip cylinder, with the label vacuum-grip cylinder including adjustable suction strips. The method comprising rotatably attaching the label vacuum-grip cylinder to a support; positioning an indicator holder support shaft adjacent a periphery of the label vacuum-grip cylinder; positioning an indicator support holder on the indicator holder support shaft and fixing the indicator support holder in a selected position on the indicator holder support shaft; and positioning a first indicator and a second indicator with the indicator support holder. The indicator support holder supports the first indicator and the second indicator. The first indicator has a first display face with a first display and the second indicator has a second display face with a second display. A first projection area of the first display face of the first indicator projects perpendicularly from the first display face. A second projection area of the second display face of the second indicator projects perpendicularly from the second display face. The indicator support holder supports the first indicator and the second indicator such that the first projection area and the second projection area do not overlap and neither the first indicator nor the second indicator obscures either the first display or the second display. The method further includes rotating the label vacuum-grip cylinder and measuring positions of at least one of the adjustable suction strips with the first indicator and the second indicator by having the at least one of the adjustable suction strips abut a first probe of the first indicator and a second probe of the second indicator; and adjusting a position of the at least one of the adjustable suction strips based on the positions of the at least one of the adjustable suction strips measured during the step of rotating the label vacuum-grip cylinder and measuring positions of at least one of the adjustable suction strips with the first indicator and the second indicator.

Another aspect of the present invention is to provide a calibration system comprising a label vacuum-grip cylinder, with the label vacuum-grip cylinder including adjustable suction strips, a support rotatably supporting the label vacuum-grip cylinder, an indicator holder support shaft positioned adjacent a periphery of the label vacuum-grip cylinder, an indicator support holder positioned on the indicator holder support shaft, and a first indicator and a second indicator being supported by the indicator support holder. The first indicator has a first display face with a first display and the second indicator has a second display face with a second display. A first projection area of the first display face of the first indicator projects perpendicularly from the first display face. A second projection area of the second display face of the second indicator projects perpendicularly from the second display face. The indicator support holder supports the first indicator and the second indicator such that the first projection area and the second projection area do not overlap and neither the first indicator nor the second indicator obscures either the first display or the second display.

Yet another aspect of the present invention is to provide a label vacuum-grip cylinder calibration system comprising an indicator support holder, a first indicator fixed in position within the indicator support holder, and a second indicator fixed in position within the indicator support holder. The first indicator has a first display face with a first display, with a first projection area of the first display face of the first indicator projecting perpendicularly from the first display face. The second indicator has a second display face with a second display, with a second projection area of the second display face of the second indicator projecting perpendicularly from the second display face. The indicator support holder supports the first indicator and the second indicator such that the first projection area and the second projection area do not overlap and neither the first indicator nor the second indicator obscures either the first display or the second display.

BRIEF DESCRIPTION OF THE DRAWINGS

One or more embodiments of the present invention are illustrated by way of example and should not be construed as being limited to the specific embodiments depicted in the accompanying drawings, in which like reference numerals indicate similar elements.

Figure 1:
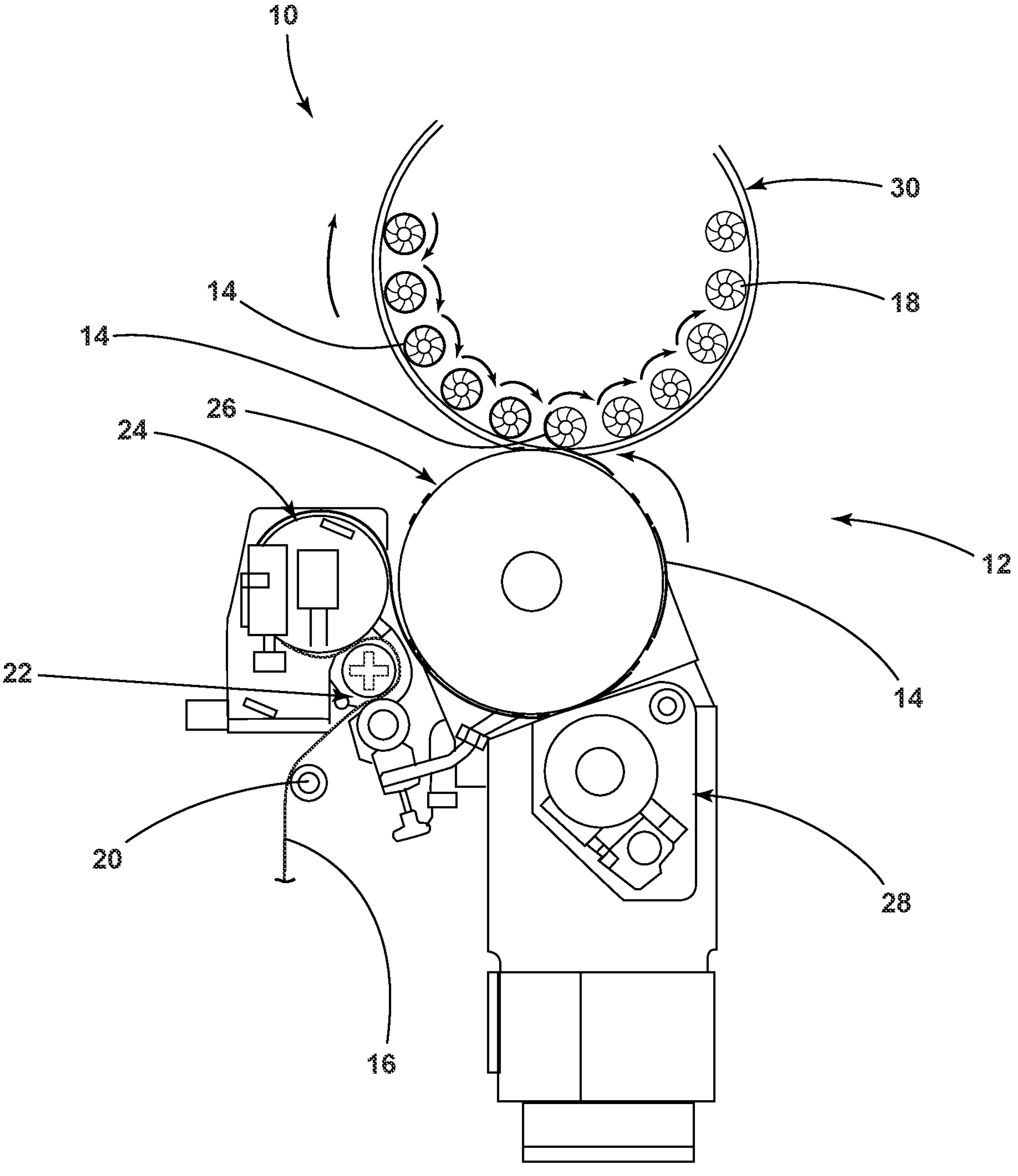
FIG. 1 (PRIOR ART)
FIG. 1 is a schematic view of a prior art container filling and labeling system.
Figure 2:
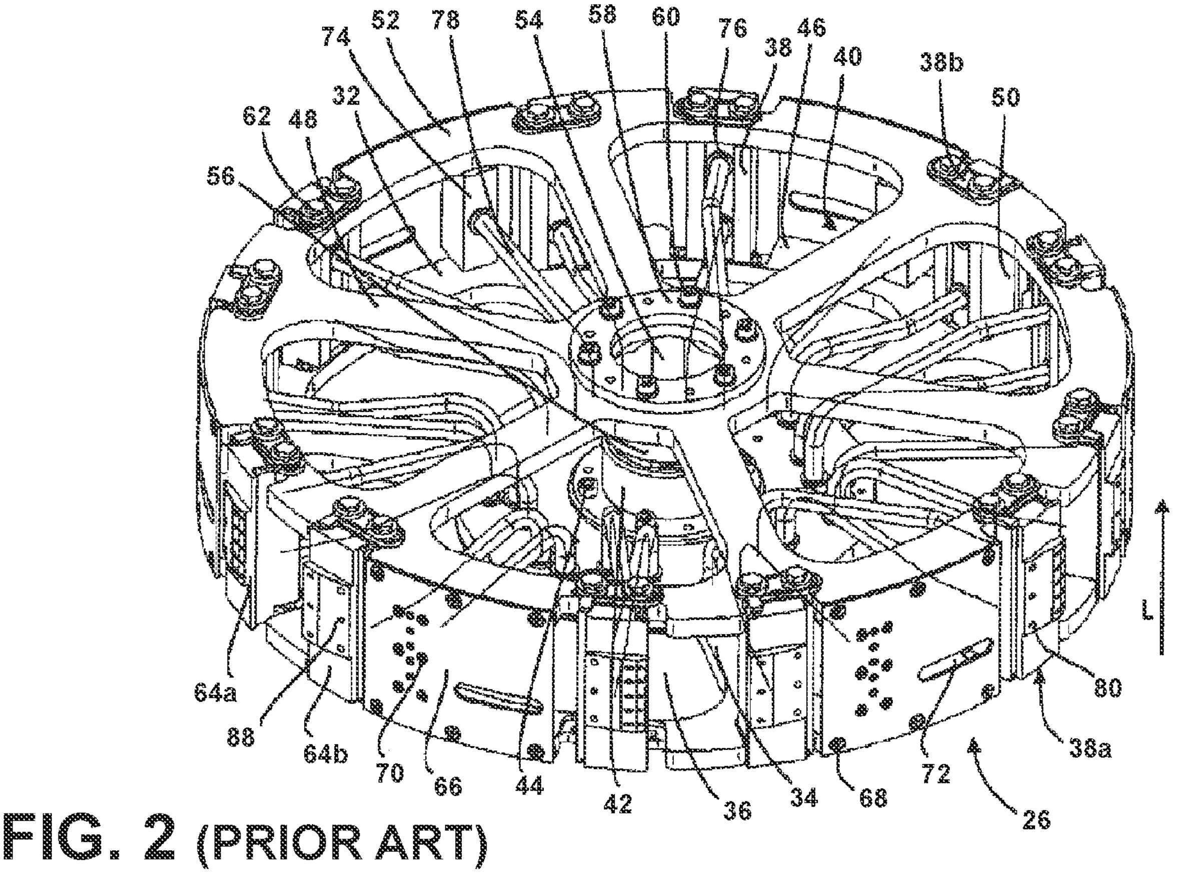
FIG. 2 (PRIOR ART)
FIG. 2 is a perspective view of a prior art vacuum-grip cylinder.
Figure 3:
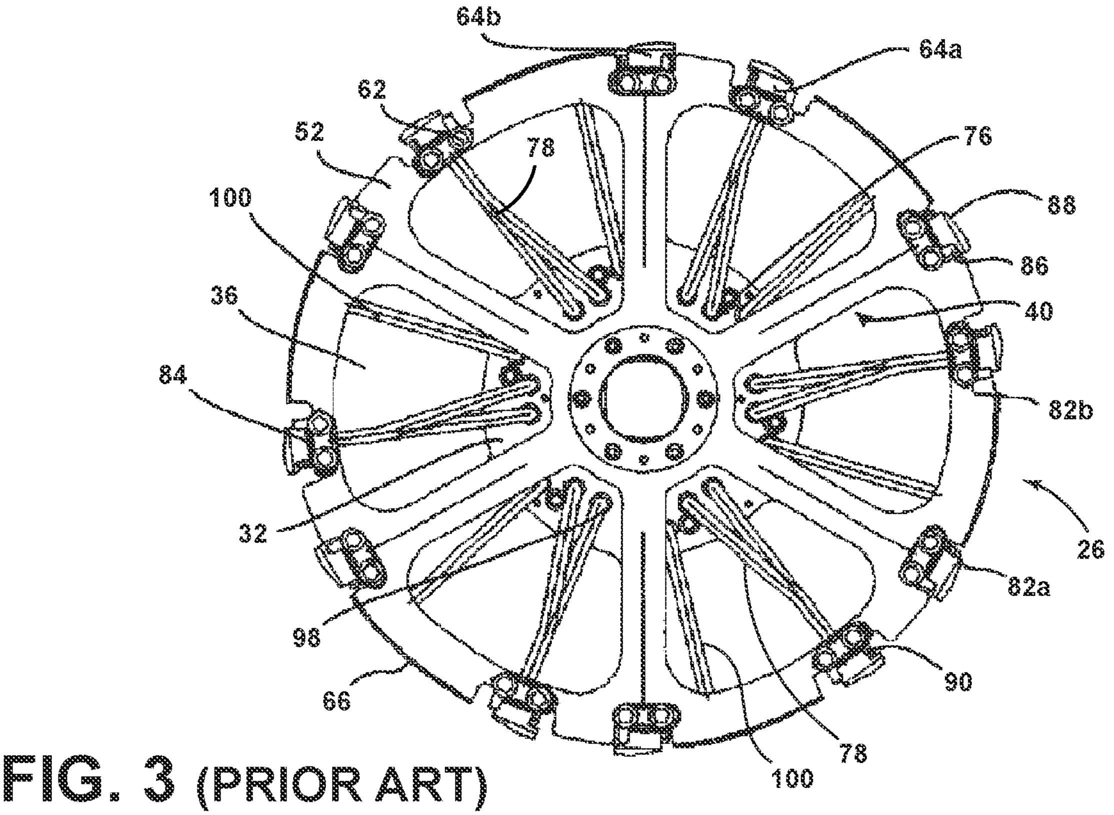
FIG. 3 (PRIOR ART)
FIG. 3 is a top view of the prior art vacuum-grip cylinder.
Figure 4:
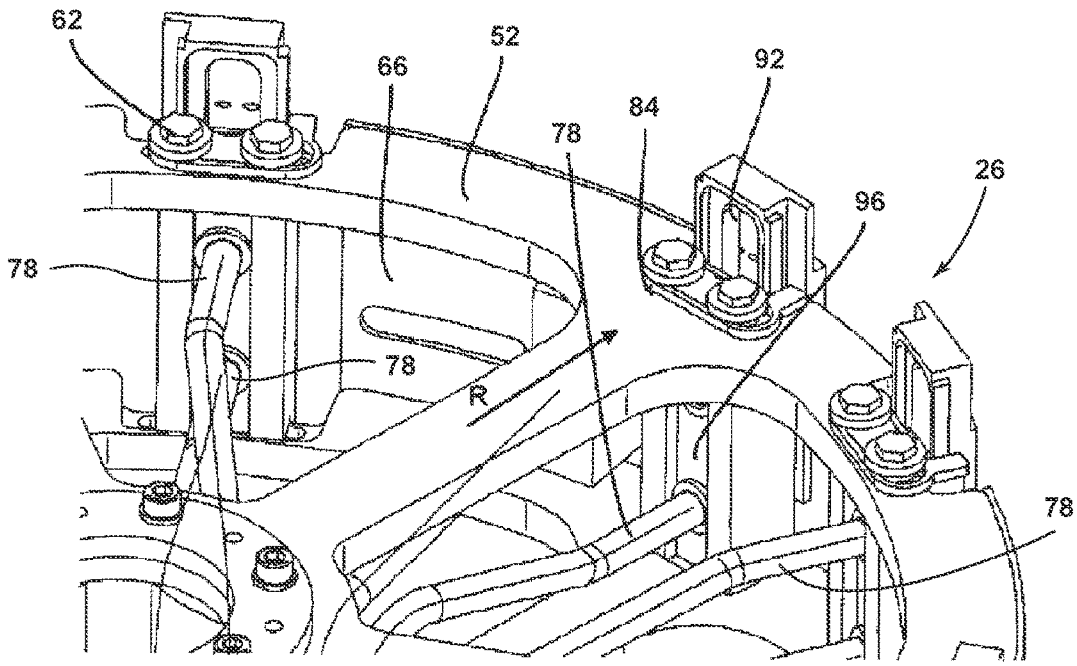
FIG. 4 (PRIOR ART)
FIG. 4 is a detail view of the prior art vacuum-grip cylinder with suction strips partially pushed out.
Figure 5:
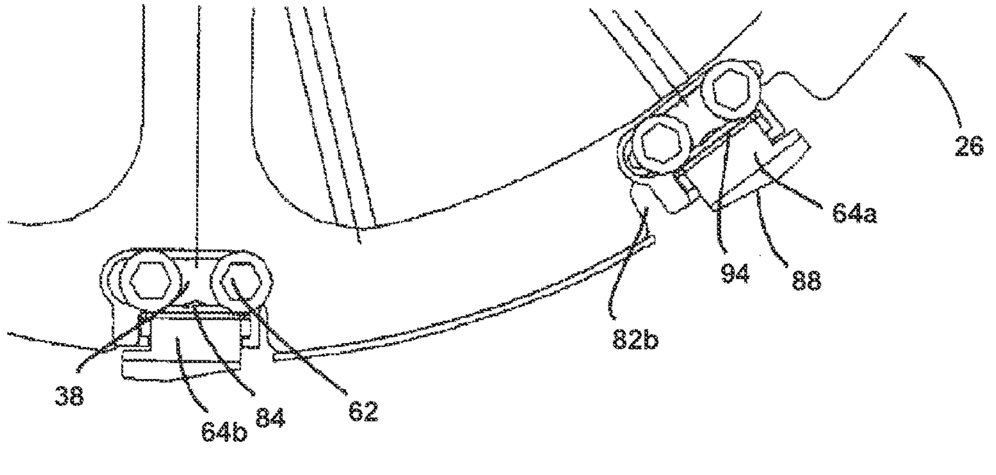
FIG. 5 (PRIOR ART)
FIG. 5 is a partial plan view of the prior art view from FIG. 4.
Figure 6:
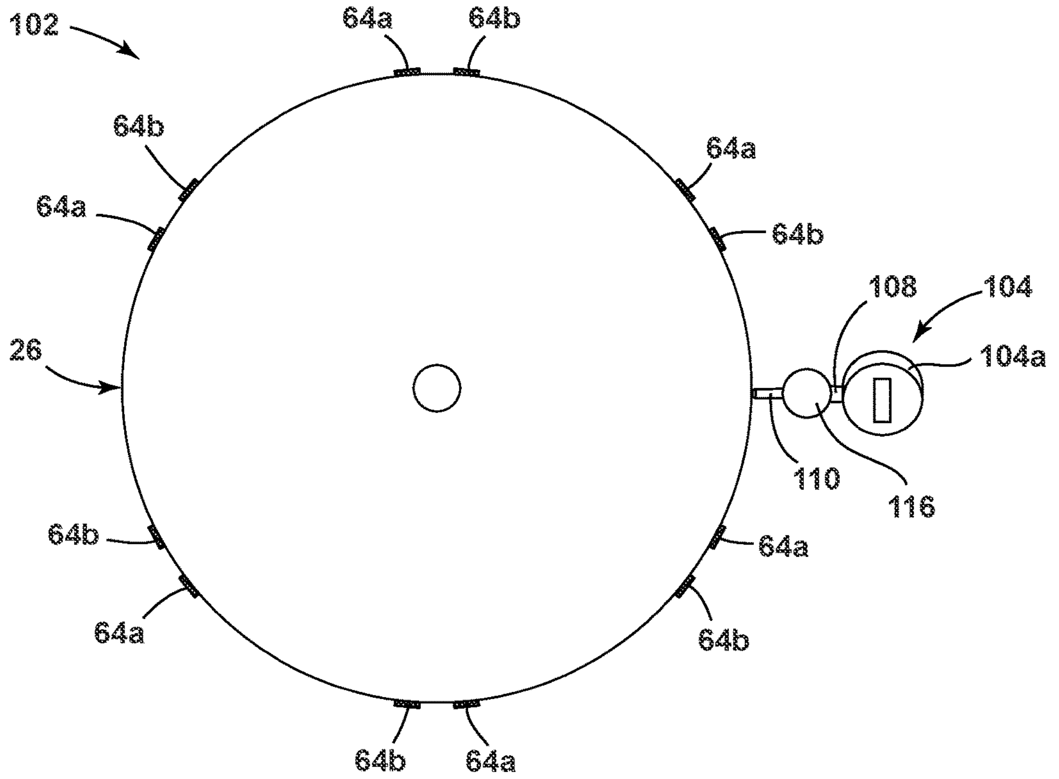
FIG. 6 (PRIOR ART)
FIG. 6 is a top view of a first prior art positioning system.
Figure 7:
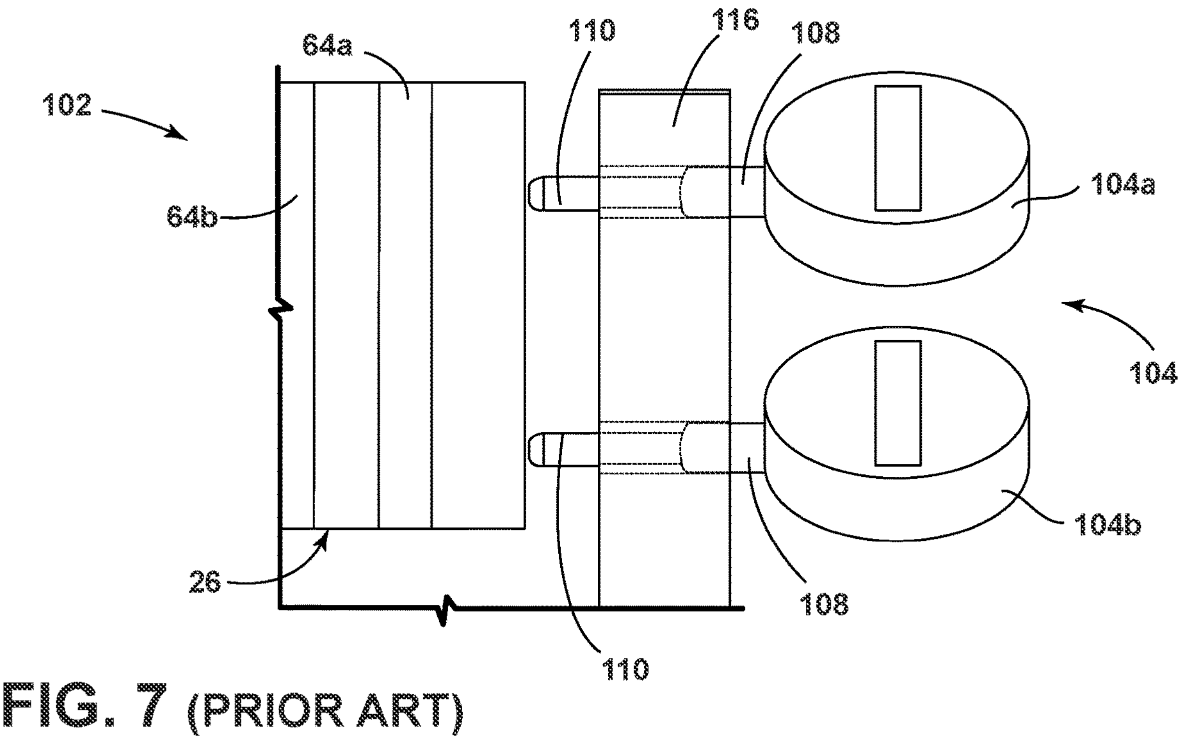
FIG. 7 (PRIOR ART)
FIG. 7 is a side view of the first prior art positioning system.
Figure 8:
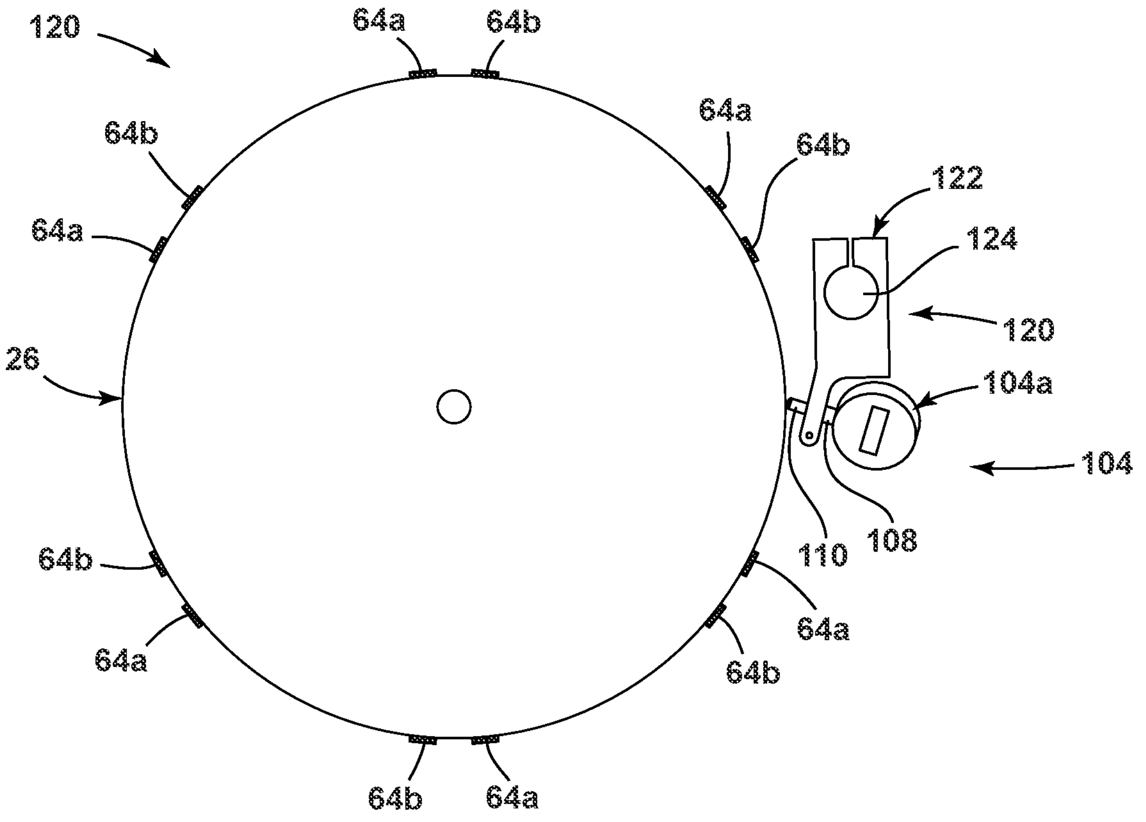
FIG. 8 (PRIOR ART)
FIG. 8 is a top view of a second prior art positioning system.
Figure 9:
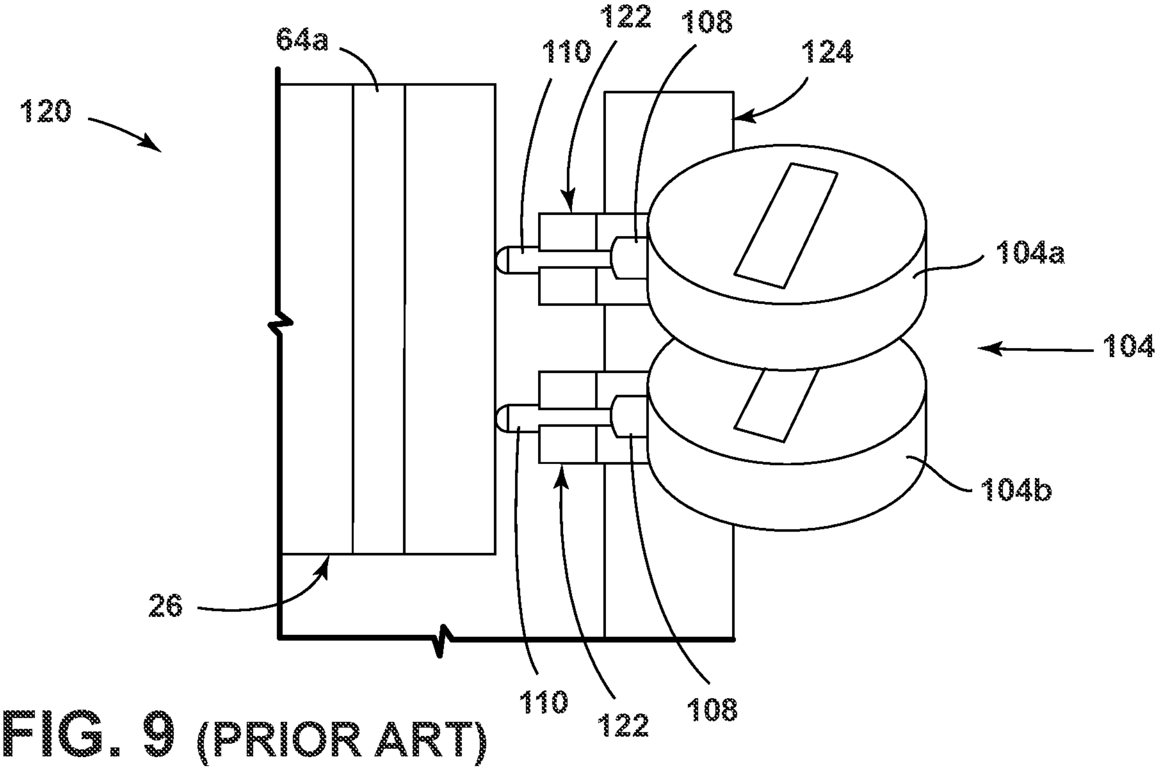
FIG. 9 (PRIOR ART)
FIG. 9 is a side view of the second prior art positioning system.
Figure 11:
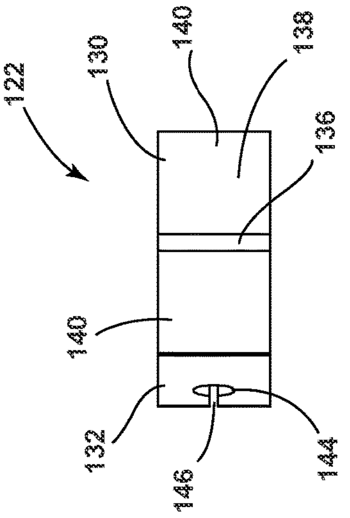
FIG. 11 (PRIOR ART)
FIG. 11 is an end view of the indicator holder of the second prior art positioning system.
Figure 13:
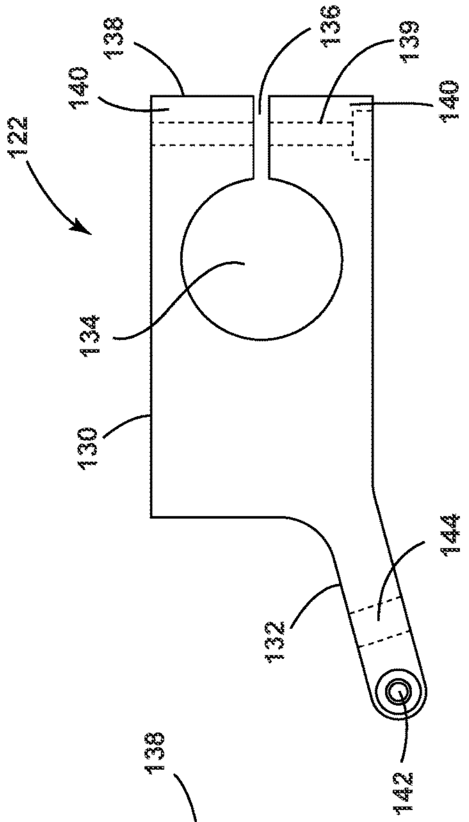
FIG. 13 (PRIOR ART)
FIG. 13 is a top view of the indicator holder of the second prior art positioning system.
Figure 10:
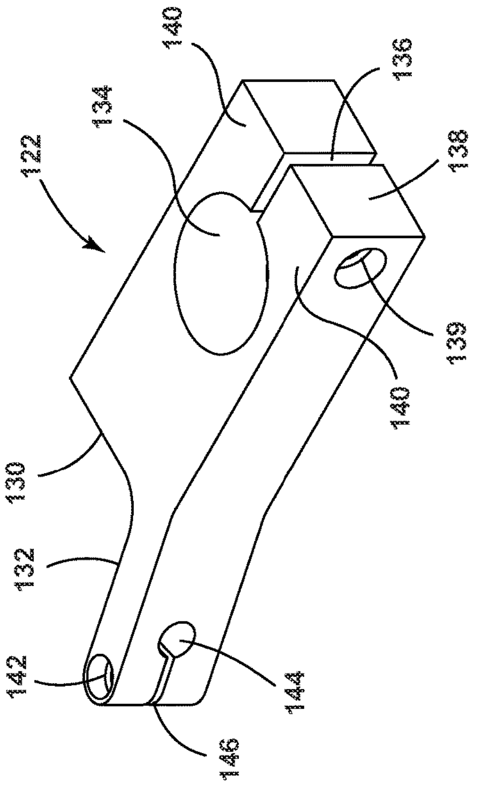
FIG. 10 (PRIOR ART)
FIG. 10 is a perspective view of an indicator holder of the second prior art positioning system.
Figure 12:
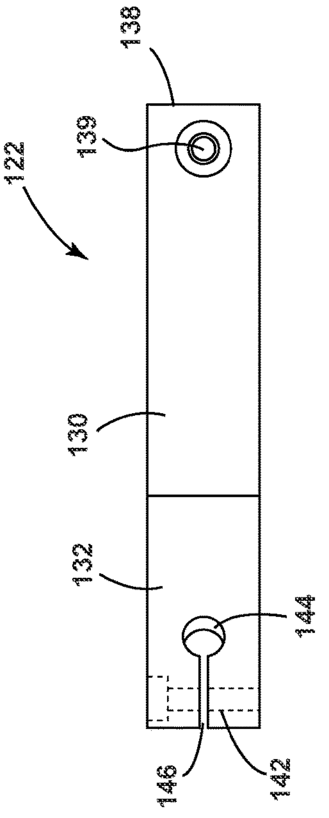
FIG. 12 (PRIOR ART)
FIG. 12 is a side view of the indicator holder of the second prior art positioning system.

The specific devices and processes illustrated in the attached drawings and described in the following specification are simply exemplary embodiments of the inventive concepts. Hence, specific dimensions and other physical characteristics relating to the embodiments disclosed herein are not to be considered as limiting.

DETAILED DESCRIPTION

For purposes of description herein, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 200 (FIGS. 14 and 15) generally designates an embodiment of the positioning system of the present invention. The positioning system 200 includes the vacuum-grip cylinder 26 rotatably supported on a central rotating shaft extending vertically upwardly from a support surface 204. An indicator support holder 206 holds a pair of indicators 208 including an upper indicator 208*a* and a lower indicator 208*b* for allowing the indicators to measure the positioning of the suction strips 64*a*, 64*b* on the vacuum-grip cylinder 26. An indicator holder support shaft 209 extends vertically from the support surface 204 substantially parallel to a central rotating shaft rotatably holding the vacuum-grip cylinder 26. The indicator support holder 206 is fixed in position on the indicator holder support shaft 209 as discussed below in a vertically selected position. It is contemplated that the positioning system 200 of the present invention can be identical to the second prior art positioning system 120, except for the substitution of the indicator support holder 206 of the present invention substituted for the pair of prior art indicator holders 122.

The indicators 208 are well known to those skilled in the art. The indicators 208 can include a display housing 210 having a shaft housing 212 extending from a perimeter 214 thereof. A probe shaft 216 extends from the shaft housing 212 and is configured to slid therein. As is well known to those skilled in the art, the display housing 210 and the shaft housing 212 are kept stationary and an object is moved against the probe shaft 216 to measure a distance travelled by the probe shaft 216. The display housing 210 can have a digital display 218 to show the distance travelled by the probe shaft 216 relative to the shaft housing 212 and the display housing 210 as is well known to those skilled in the art. Instead of the digital display 218, the display housing 210 could have an analog display. It is contemplated that the display housings 210 could have a calibration rotary knob 220 extending from a surface therefor for calibrating the measurements of the indicators 206 as is well known to those skilled in the art. As described in more detail below, the probe shaft 216 of the lower indicator 208*b* has an extension shaft 222 connected to an end thereof.

In the illustrated example, the indicator support holder 206 (FIGS. 16-24) holds the upper indicator 208*a* and the lower indicator 208*b* for allowing the indicators 208 to measure the positioning of the suction strips 64*a*, 64*b* on the vacuum-grip cylinder 26. The indicator support holder 206 includes an upper indicator support area 224 supporting the upper indicator 208*a*, a lower indicator support area 226 supporting the lower indicator 208*b*, and a pole connection area 228 for connecting the indicator support holder 206 to the indicator holder support shaft 209. It is contemplated that the pole connection area 228 could be connected to one or both of the upper indicator support area 224 and the lower indicator support area 226. Furthermore, it is contemplated that the pole connection area 228 could be integral with the indicator holder support shaft 209, although the pole connection area 228 is illustrated as being separate from the indicator holder support shaft 209. The upper indicator support area 224 and the lower indicator support area 226 are also interconnected to each other.

In the embodiment of FIGS. 16-24, the upper indicator support area 224 and the lower indicator support area 226 are integral with each other and with the pole connection area 228. The lower indicator support area 226 and the pole connection area 228 are locations on a first block 230 having an upper surface 232, a lower surface 234 and a side edge 235 between the upper surface 232 and the lower surface 234. The pole connection area 228 is substantially rectangular as viewed from above in FIG. 21. The side edge 235 of the first block 230 of the pole connection area 228 includes a first end side 236 extending between a second side 238 and a third side 240 that are substantially parallel. The pole connection area 228 is integral with the lower indicator support area 226.

The illustrated pole connection area 228 includes a pole hole 242 extending between the upper surface 232 and the lower surface 234 that is configured to receive the indicator holder support shaft 209 therethrough. A first clamp slot 244 extends from the first end side 236 to the pole hole 242 such that the pole hole 242 does not form a closed cylinder. The first clamp slot 244 forms a first clamp first wing 246 and a first clamp second wing 248 on each side of the first clamp slot 244. A first fastener hole 250 extends from the second side 238 to the third side 240 in a direction substantially parallel to the first end side 236 and substantially perpendicular to the pole hole 242. The first fastener hole 250 extends through the first clamp first wing 246 and the first clamp second wing 248. A first fastener 252 is inserted into the first fastener hole 250 to pull the first clamp first wing 246 and the first clamp second wing 248 toward each other in order to shrink the diameter of the pole hole 242 in order to fix the pole connection area 228 of the indicator support holder 206 to the indicator holder support shaft 209 via friction. It is contemplated that the first fastener 252 can have a nut on an end thereof for pulling the first clamp first wing 246 and the first clamp second wing 248 toward each other. Alternatively, it is contemplated that a portion of the first fastener hole 250 in one of the first clamp first wing 246 and the first clamp second wing 248 could be threaded to receive the first fastener 252. The first fastener hole 250 can have a first counterbore 253 for receiving a head of the first fastener 252, which is shown as being in the second side 238 in FIG. 21.

In the illustrated example, the lower indicator support area 226 is integral with the pole connection area 228. The side edge 235 of the first block 230 of the lower indicator support area 226 includes a fourth side 254 angled from (e.g., at 135°) and connected to the second side 238, a fifth side 256 connected to the fourth side 254, a sixth side 258 opposite the pole connection area 228, and a seventh side 260 opposite the fifth side 256. The fifth side 256 and the seventh side 260 are shown as being substantially parallel to each other and perpendicular to the sixth side 258. The seventh side 260 is angled from (e.g., at 165°) and connected to the third side 240.

The illustrated lower indicator support area 226 includes a lower indicator hole 262 configured to receive the shaft housing 212 of the lower indicator 208*b*. The lower indicator hole 262 extends between the fifth side 256 and the seventh side 260 substantially parallel to the sixth side 258 and both the upper surface 232 and lower surface 234 of the first block 230. The lower indicator hole 262 is located closer to the lower surface 234 than the upper surface 232. A second clamp 264 is located near the display 218 in the lower indicator support area 226. The second clamp 264 is located at the corner of the fifth side 256 and the sixth side 260. A second clamp slot 270 extends from the fifth side 256 and the sixth side 260 and extends into the lower indicator hole 262 such that the lower indicator hole 262 does not form a closed cylinder. The second clamp slot 270 forms a second clamp first wing 272 and a second clamp second wing 274 on each side of the second clamp slot 270. A clamp channel 276 extends on a side of one of at least one of the second clamp first wing 272 and the second clamp second wing 274 opposite the fifth side 256. In the illustrated embodiment, the clamp channel 276 is shown as being located below the second clamp second wing 274 to allow the second clamp second wing 274 to move relative to the rest of the first block 230 while the second clamp first wing 272 is integral and solidly connected to the rest of the first block 230.

In the illustrated example, a second fastener hole 268 and second fastener 278 are employed to secure the lower indicator 208*b* in the lower indicator hole 262. The second fastener hole 268 extends from the upper surface 232 to the lower surface 234 in a direction substantially parallel to the sixth side 258 and substantially perpendicular to the second fastener hole 268. The second fastener hole 268 extends through the second clamp first wing 272 and the second clamp second wing 274. The second fastener 278 is inserted into the second fastener hole 268 to pull the second clamp first wing 272 and the second clamp second wing 274 toward each other in order to shrink the diameter of the lower indicator hole 262 in order to fix the shaft housing 212 of the lower indicator 208*b* to the lower indicator hole 262 via friction. It is contemplated that the second fastener 278 can have a nut on an end thereof for pulling the second clamp first wing 272 and the second clamp second wing 274 toward each other. Alternatively, it is contemplated that a portion of the second fastener hole 250 in one of the second clamp first wing 272 and the second clamp second wing 274 could be threaded to receive the second fastener 278. The second fastener hole 268 can have a counterbore for receiving a head of the second fastener 278.

The illustrated upper indicator support area 224 is integral with the first block 230 and extends from the upper surface 232 of the first block 230 at the corner of the sixth side 258 and the seventh side 260 of the first block 230. The upper indicator support area 224 is a second block 280 having a rectangular side surface 282, an upper surface 284 and a bottom connected to the upper surface 232 of the first block 230. The rectangular side surface 282 includes a first side 286, an opposite second side 288 parallel to the first side 286, a third side 290, and an opposite fourth side 292 parallel to the third side 290. The second side 288 of the second block 280 is coplanar with the sixth side 258 of the first block 230 and the fourth side 292 is coplanar with the seventh side 260 of the first block 230.

In the illustrated example, the illustrated upper indicator support area 224 includes an upper indicator hole 294 configured to receive the shaft housing 212 of the upper indicator 208*a*. The upper indicator hole 294 extends between the third side 290 and the fourth side 292 substantially parallel to the first side 286 and the second side 288 of the second block 280. The upper indicator hole 294 is also parallel to the lower indicator hole 262. The upper indicator support area 224 is divided to form a third clamp 296. The third clamp 296 includes a third clamp first wing 298 and a third clamp second wing 300. A third clamp slot 302 extends from the second side 288 and extends into the upper indicator hole 294 such that the upper indicator hole 294 does not form a closed cylinder. The third clamp slot 302 forms the third clamp first wing 298 and the third clamp second wing 300 on each side of the third clamp slot 302.

In the illustrated embodiment, a third fastener hole 304 and a third fastener 306 are employed to secure the upper indicator 208*a* in the upper indicator hole 294. The third fastener hole 304 extends from the upper surface 284 of the second block 280 in a direction substantially parallel to the second side 288 of the second block 280 and substantially perpendicular to the third fastener hole 304. The third fastener hole 304 extends through the third clamp first wing 298 and the third clamp second wing 300. The third fastener 306 is inserted into the third fastener hole 304 to pull the third clamp first wing 298 and the third clamp second wing 300 toward each other in order to shrink the diameter of the upper indicator hole 294 in order to fix the shaft housing 212 of the upper indicator 208*a* to the upper indicator hole 294 via friction. It is contemplated that the third fastener 306 can extend entirely through the second block 280 and the first block 230 and have a nut on an end thereof for pulling the third clamp first wing 298 and the third clamp second wing

300 toward each other. Alternatively, it is contemplated that a portion of the third fastener hole 304 in one of the third clamp first wing 298 and the third clamp second wing 300 could be threaded to receiving the third fastener 306. In the illustrated example, the third fastener hole 304 does not extend through the first block 230 with the portion of the third fastener hole 304 in the third clamp second wing 300 and in a portion of the first block 230 being threaded. The third fastener hole 304 can have a counterbore for receiving a head of the third fastener 306.

Like the first prior art positioning system 102 and the second prior art positioning system 120, during use of the positioning system 200, the probe shaft 216 of the upper indicator 208*a* and the extension shaft 222 of the lower indicator 208*b* abut against the suction strips 64*a*, 64*b* as the suction strips 64*a*, 64*b* are rotated past the probe shaft 216 of the upper indicator 208*a* and the extension shaft 222 of the lower indicator 208*b*. If the suction strips 64*a*, 64*b* extend too far out or not far enough out from the vacuum-grip cylinder 26 as measured by the pair of indicators 208 to have an appropriate amount of hotmelt glue placed on labels 14 suctioned thereto, the position of the suction strips 64*a*, 64*b* can be altered as outlined above and as known to those skilled in the art. Having the upper indicator 208*a* and the lower indicator 208*b* allows for the face of the suction strips 64*a*, 64*b* to be on a proper plane.

Figure 15:
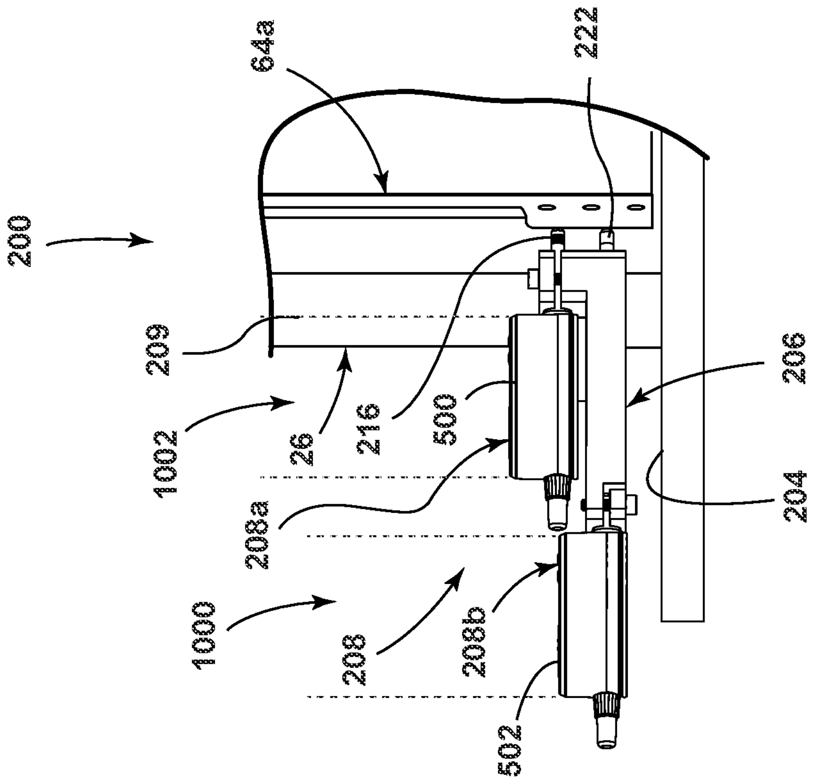
FIG. 15 is a partial side view of an embodiment of the positioning system according to the present invention.
Figure 14:
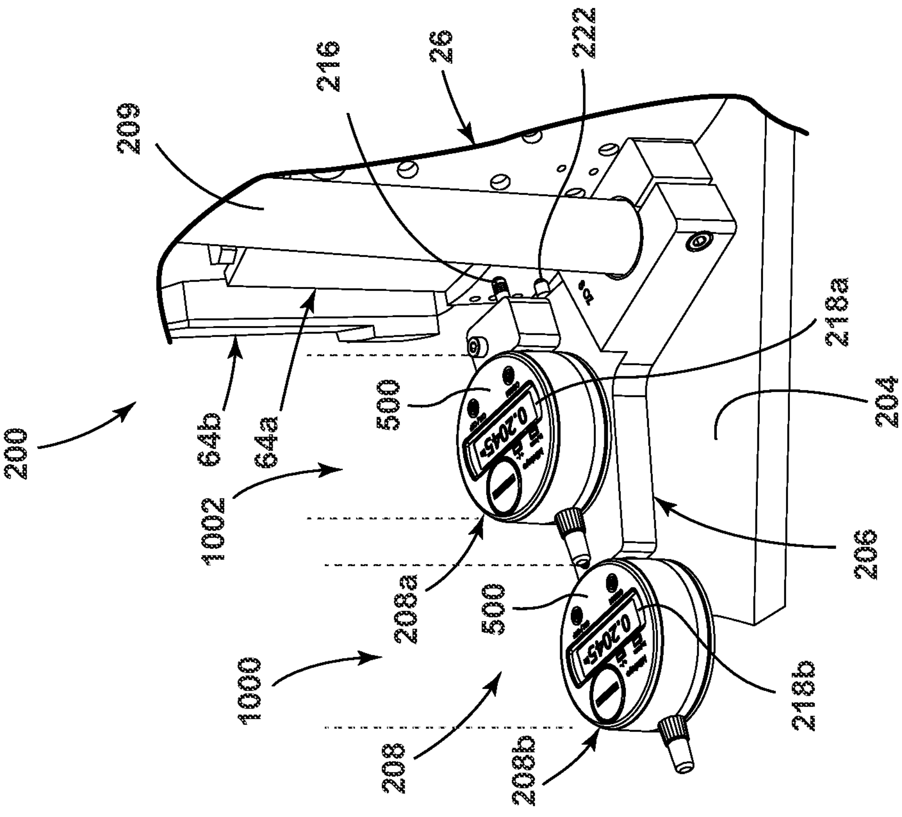
FIG. 14 is a partial perspective view of an embodiment of a positioning system according to the present invention.
Figure 17:
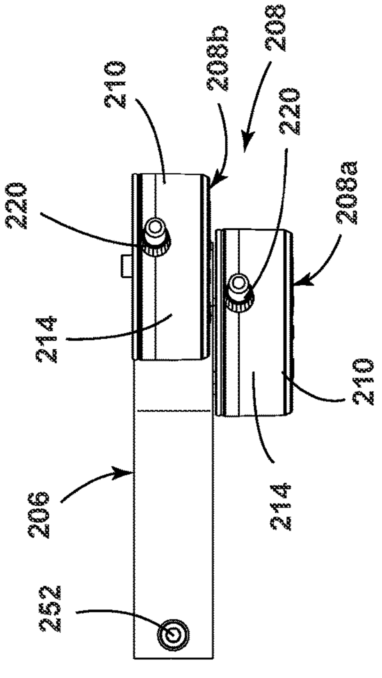
FIG. 17 is an end of an embodiment of the indicator support holder according to the present invention holding the pair of indicators.
Figure 18:
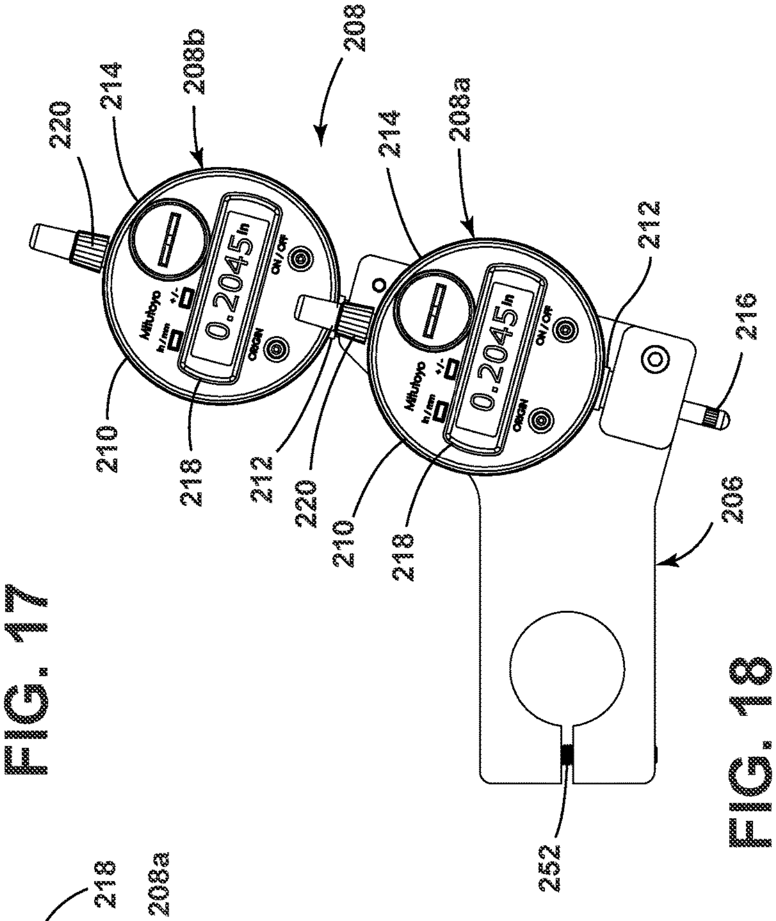
FIG. 18 is a top view of an embodiment of the indicator support holder according to the present invention holding the pair of indicators.
Figure 16:
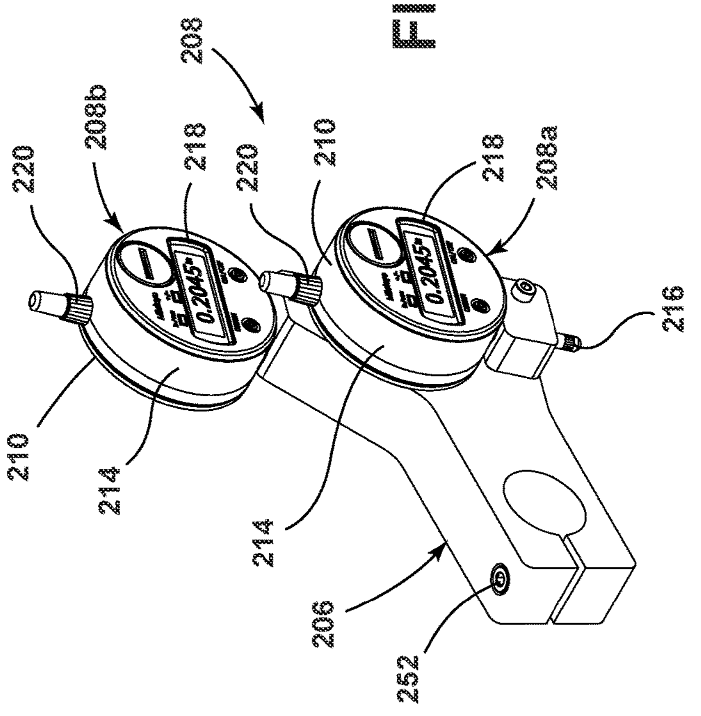
FIG. 16 is a perspective view of an embodiment of an indicator support holder according to the present invention holding a pair of indicators.
Figure 20:
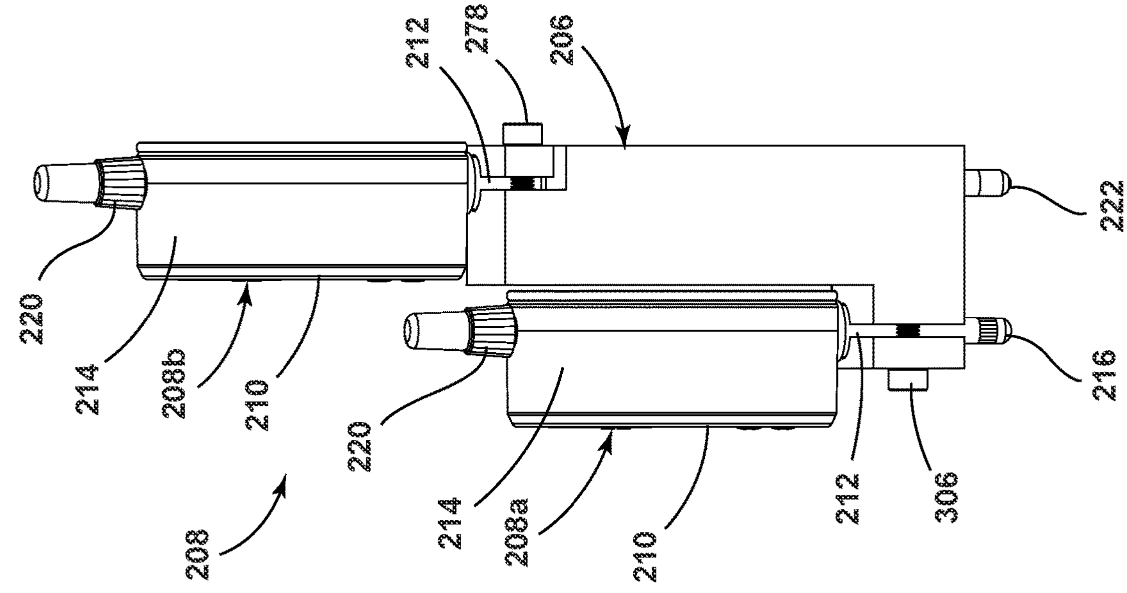
FIG. 20 is a second side view of an embodiment of the indicator support holder according to the present invention holding the pair of indicators.
Figure 19:
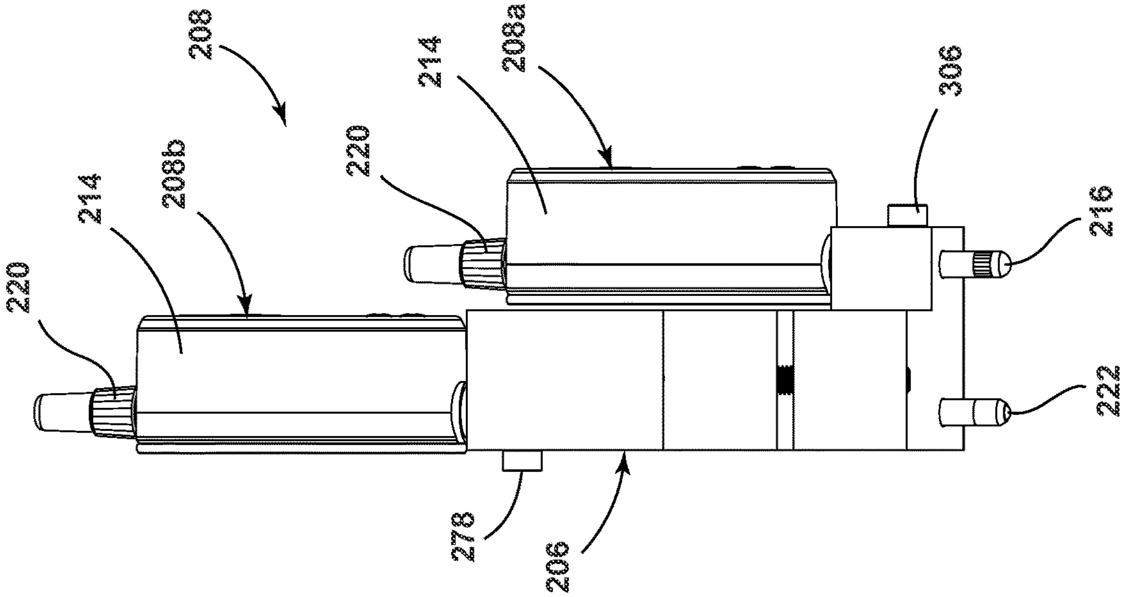
FIG. 19 is a first side view of an embodiment of the indicator support holder according to the present invention holding the pair of indicators.
Figure 22:
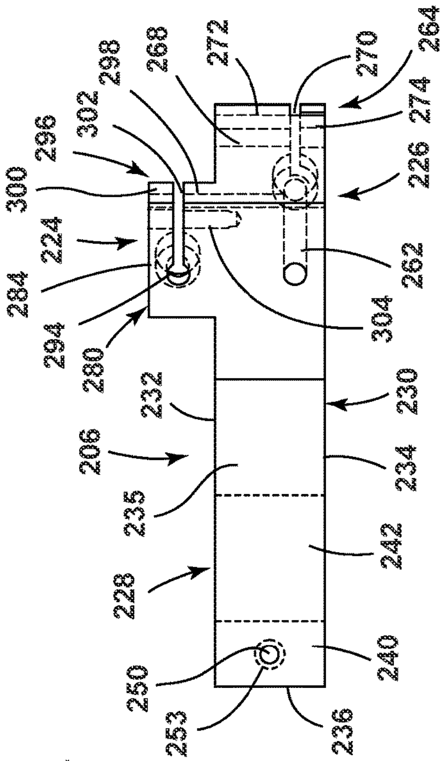
FIG. 22 is a first end view of an embodiment of the indicator support holder according to the present invention.
Figure 24:
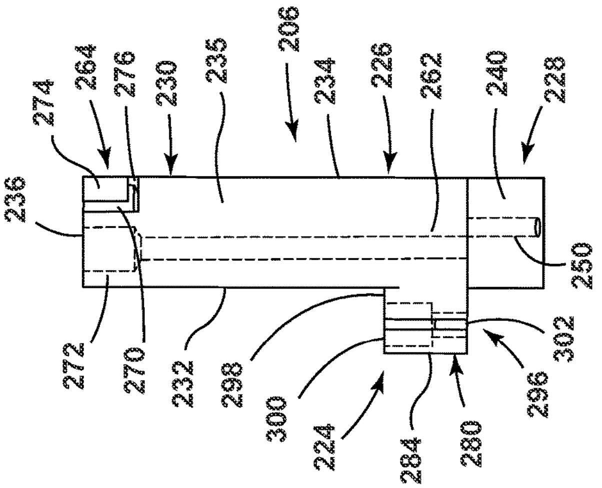
FIG. 24 is a side view of an embodiment of the indicator support holder according to the present invention.
Figure 21:
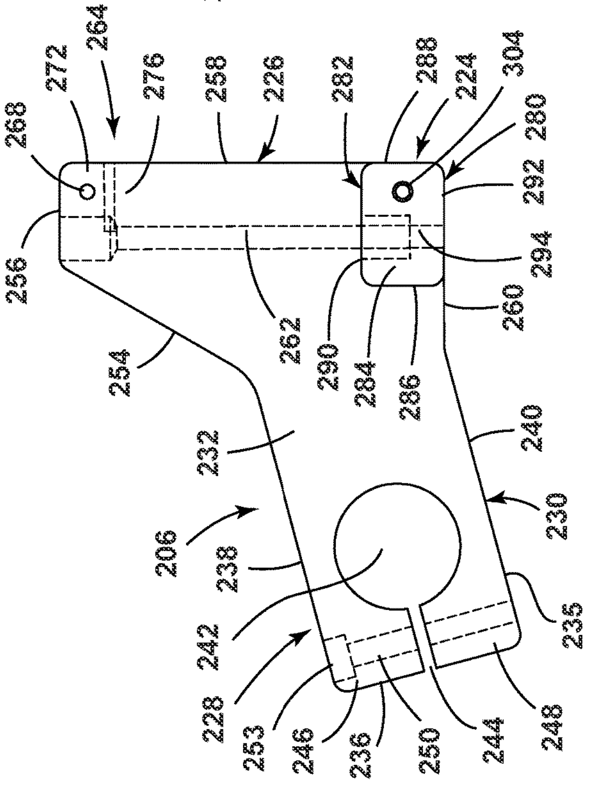
FIG. 21 is a top view of an embodiment of the indicator support holder according to the present invention.
Figure 23:
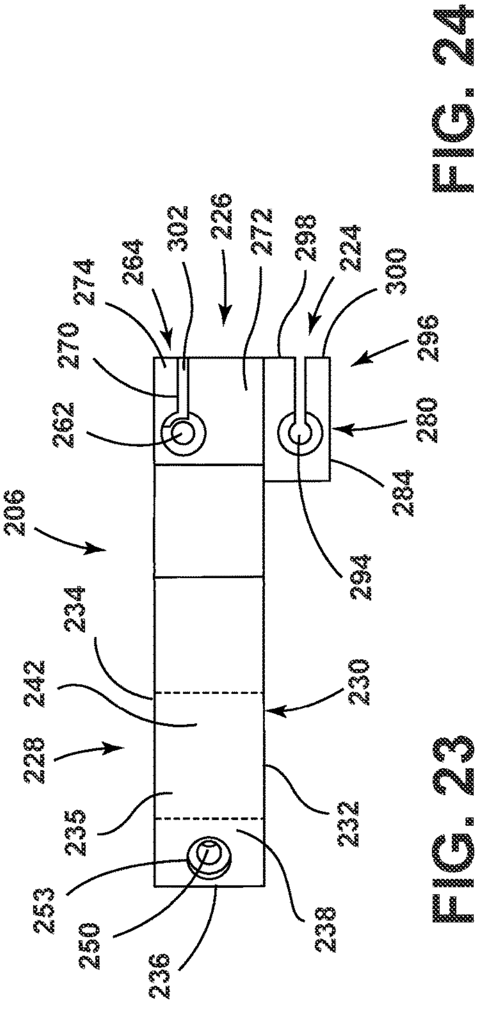
FIG. 23 is a second side view of an embodiment of the indicator support holder according to the present invention.
Figure 26:
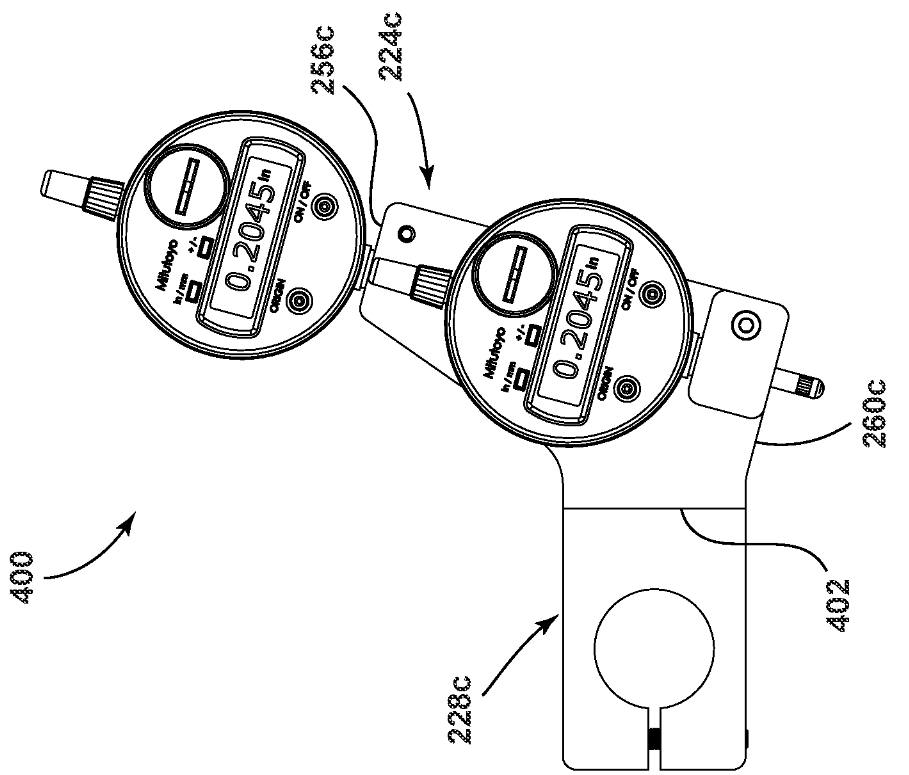
FIG. 26 is a top of another embodiment of the indicator support holder according to the present invention holding the pair of indicators.
Figure 25:
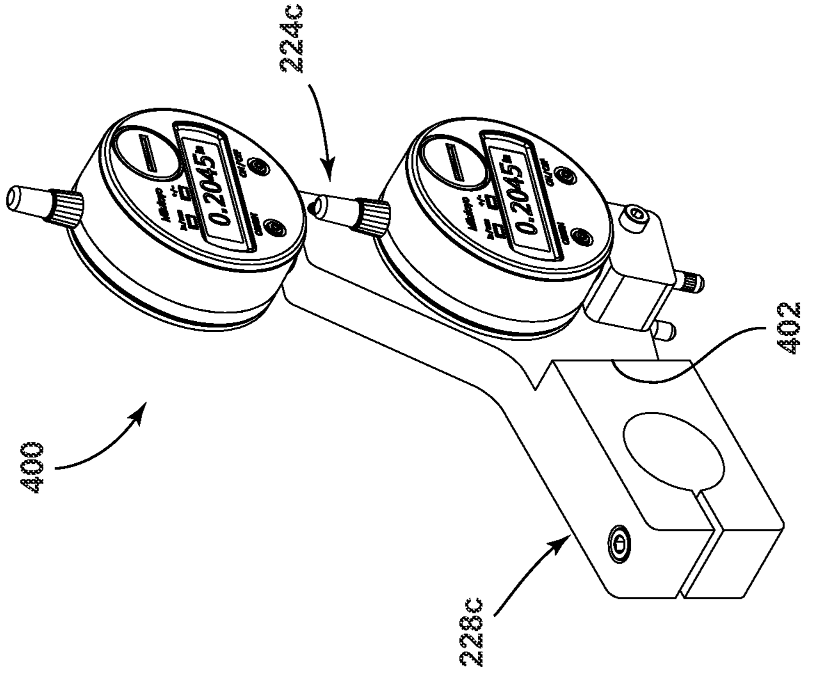
FIG. 25 is a perspective view of another embodiment of an indicator support holder according to the present invention holding a pair of indicators.
Figure 29:
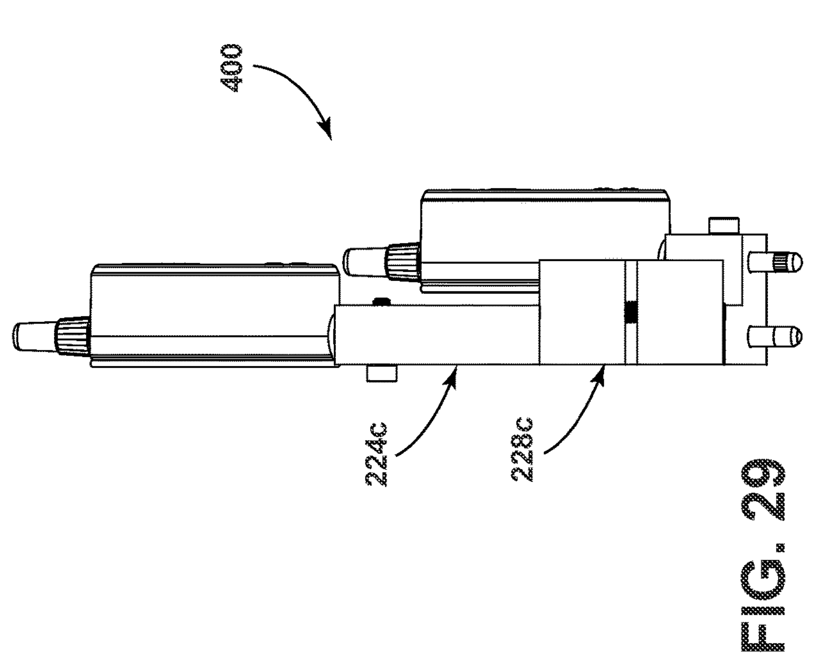
FIG. 29 is a second side view of another embodiment of the indicator support holder according to the present invention holding the pair of indicators.
Figure 28:
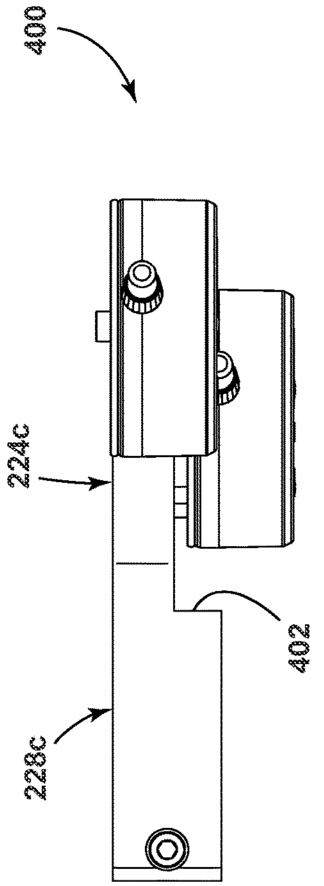
FIG. 28 is an end view of another embodiment of the indicator support holder according to the present invention holding the pair of indicators.
Figure 27:
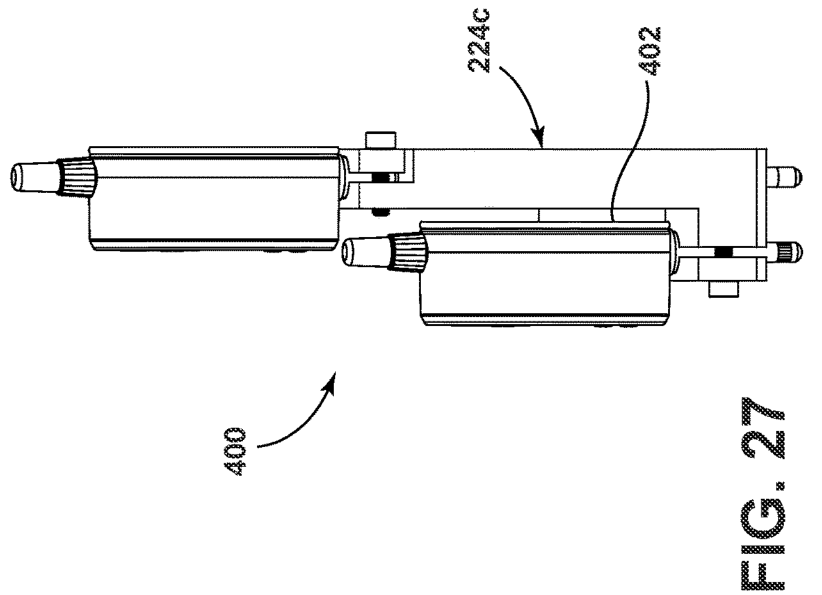
FIG. 27 is a first side view of another embodiment of the indicator support holder according to the present invention holding the pair of indicators.

In the illustrated example and shown in FIGS. 14 and 15, the upper indicator 208*a* has a first display face 500 with the display 218*a* (digital as shown or analog) and the lower indicator 208*b* has a second display face 502 with the display 218*b* (digital as shown or analog). A first projection area 1002 of the first display face 500 of the upper indicator 208*a* projects perpendicularly from the first display face 500. A second projection area 1000 of the second display face 502 of the lower indicator 208*b* projects perpendicularly from the second display face 502. The indicator support holder 206 supports the upper indicator 208*a* and the lower indicator 208*b* such that the first projection area 1002 and the second projection area 1000 do not overlap and neither the upper indicator 208*a* nor the lower indicator 208*b* obscures either the display 218*a* (digital as shown or analog) of the upper indicator 208*a* or the display 218*b* (digital as shown or analog) or the lower indicator 208*b*.

The reference numeral 400 (FIGS. 25-29) generally designates another embodiment of the positioning system of the present invention. Since the positioning system 400 of the present second embodiment is similar to the first embodiment of the positioning system 200, similar parts appearing in FIGS. 14-24 and FIGS. 25-29 are represented by the same, corresponding reference number, except for the suffix "c" in the numerals of the latter. The second embodiment of the positioning system 400 includes a step 402 located between the lower indicator support area 224*c* and the pole connection area 228*c* such that the lower indicator support area 224*c* is thinner than the pole connection area 228*c*. To provide for sufficient support for the indicator 208 in the lower indicator support area 224*c*, the lower indicator support area 224*c* is longer such that the fifth side 256*c* is more distant from the seventh side 260*c* in the second embodiment of the positioning system 400 than the distance between the fifth side 256 and the seventh side 260 in the positioning system 200.

Figure 30:
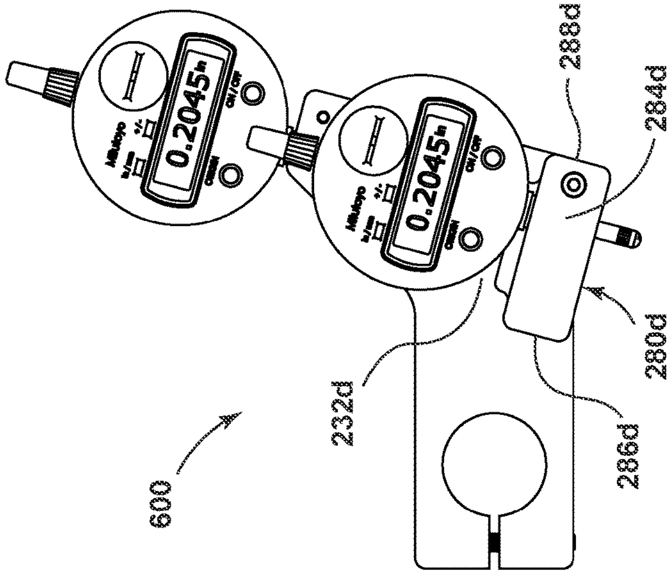
FIG. 30 is a top view of yet another embodiment of an indicator support holder according to the present invention holding a pair of indicators.
Figure 31:
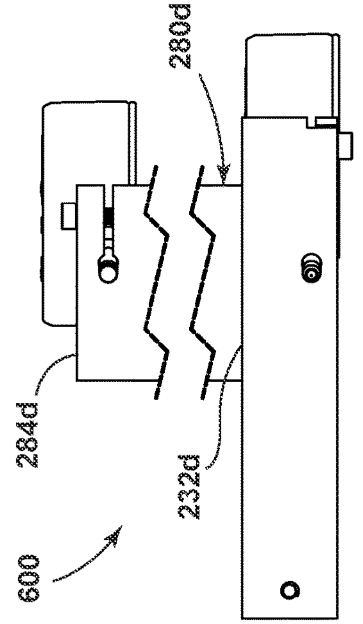
FIG. 31 is a first end view of yet another embodiment of the indicator support holder according to the present invention holding the pair of indicators.
Figure 32:
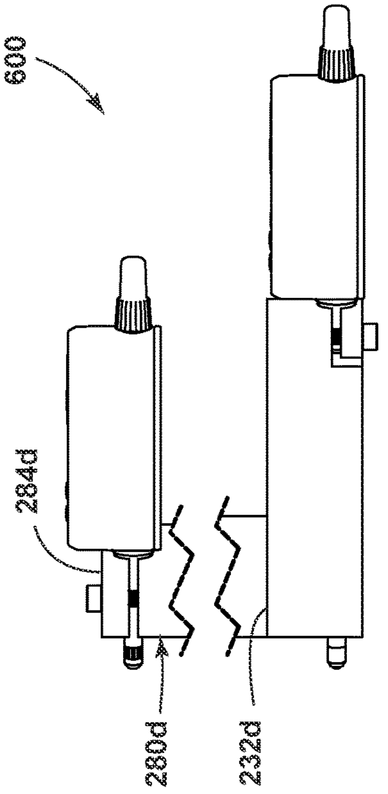
FIG. 32 is a second end view of yet another embodiment of the indicator support holder according to the present invention holding the pair of indicators.

The reference numeral 600 (FIGS. 30-32) generally designates another embodiment of the positioning system of the present invention. Since the positioning system 600 of the present third embodiment is similar to the first embodiment of the positioning system 200, similar parts appearing in FIGS. 14-24 and FIGS. 30-32 are represented by the same, corresponding reference number, except for the suffix "d" in the numerals of the latter. The third embodiment of the positioning system 600 includes a thicker block 280*d* such that the upper surface 284*d* is more distant from the upper surface 232*d* of the first block 230*d* than the distance of the upper surface 284 from the upper surface 232 of the first block 230 in the positioning system 200. The thicker block 280*d* also has a distance between the first side 286*d* and the opposite second side 288*d* greater than the distance between the first side 286 and the opposite second side 288 of the block 280 of the positioning system 200. It is contemplated that the block 280*d* and the upper indicator support area 226*d* can be removably connected to the lower indicator support area 224*d*.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A method of calibrating a label vacuum-grip cylinder, the label vacuum-grip cylinder including adjustable suction strips, the method comprising:

rotatably attaching the label vacuum-grip cylinder to a support with the label vacuum-grip cylinder having an axis of rotation;

positioning an indicator holder support shaft adjacent a periphery of the label vacuum-grip cylinder, the indicator holder support shaft extending vertically in a position substantially parallel to the axis of rotation of the label vacuum-grip cylinder;

vertically positioning an indicator support holder on the indicator holder support shaft and fixing the indicator support holder in a selected vertical position on the indicator holder support shaft;

positioning a first indicator and a second indicator with the indicator support holder, the indicator support holder supporting the first indicator and the second indicator, the first indicator having a first display face with a first display and the second indicator having a second display face with a second display, a first projection area of the first display face of the first indicator projecting perpendicularly from the first display face, and a second projection area of the second display face of the second indicator projecting perpendicularly from the second display face;

wherein the indicator support holder supports the first indicator and the second indicator such that the first projection area and the second projection area do not overlap and neither the first indicator nor the second indicator obscures either the first display or the second display;

rotating the label vacuum-grip cylinder and measuring positions of at least one of the adjustable suction strips with the first indicator and the second indicator by having the at least one of the adjustable suction strips abut a first probe of the first indicator and a second probe of the second indicator; and adjusting a position of the at least one of the adjustable suction strips based on the positions of the at least one of the adjustable suction strips measured during the step of rotating the label vacuum-grip cylinder and measuring positions of at least one of the adjustable suction strips with the first indicator and the second indicator; wherein the indicator support holder includes an upper indicator support area supporting the second indicator, a lower indicator support area supporting the first indicator at a location which is horizontally offset from said upper indicator support area, and a pole connection area for connecting the indicator support holder to the indicator holder support shaft, wherein the upper indicator support area, the lower indicator support area and the pole connection area are integral.

2. The method of claim 1, wherein:

the first probe is longer than the second probe.

3. The method of claim 1, wherein:

the first display face and the second display face are parallel, but on different planes.

4. The method of claim 1, wherein:

the first display and the second display are digital displays.

5. The method of claim 1, wherein:

the step of positioning the indicator support holder on the indicator holder support shaft includes inserting the indicator holder support shaft through a pole hole in the indicator support holder, and shrinking the diameter of the pole hole to fix the indicator support holder in position on the indicator holder support shaft.

6. The method of claim 1, wherein:

the first probe and the second probe are parallel, but nonlinear.

7. A calibration system comprising:

a label vacuum-grip cylinder, the label vacuum-grip cylinder including adjustable suction strips;

a support rotatably supporting the label vacuum-grip cylinder with the label vacuum-grip cylinder having an axis of rotation about the support;

a vertically extending indicator holder support shaft positioned adjacent a periphery of the label vacuum-grip cylinder, the vertically extending indicator holder support shaft extending substantially parallel to the axis of rotation of the label vacuum-grip cylinder;

an indicator support holder selectively vertically positioned on the indicator holder support shaft;

a first indicator with a first probe and a second indicator with a second probe being supported by the indicator support holder;

wherein the indicator support holder includes an upper indicator support area supporting the second indicator, a lower indicator support area supporting the first indicator at a location which is horizontally offset from said upper indicator support area, and a pole connection area for connecting the indicator support holder to the indicator holder support shaft, wherein the upper indicator support area, the lower indicator support area and the pole connection area are integral; and the first indicator having a first display face with a first display and the second indicator having a second display face with a second display, a first projection area of the first display face of the first indicator projecting perpendicularly from the first display face, a second projection area of the second display face of the second indicator projecting perpendicularly from the second display face; wherein the indicator support holder supports the first indicator and the second indicator such that the first projection area and the second projection area do not overlap and neither the first indicator nor the second indicator obscures either the first display or the second display.

8. The calibration system of claim 7, wherein:

the first probe is longer than the second probe.

9. The calibration system of claim 7, wherein:

the first display face and the second display face are parallel, but on different planes.

10. The calibration system of claim 7, wherein:

the first display and the second display are digital displays.

11. The calibration system of claim 7, wherein:

the first probe and the second probe are parallel, but nonlinear.

12. A label vacuum-grip cylinder calibration system comprising:

an indicator support holder;

a first indicator with a first probe fixed in position within the indicator support holder; and a second indicator with a second probe fixed in position within the indicator support holder, the first probe being longer than the second probe;

the first indicator having a first display face with a first display, with a first projection area of the first display face of the first indicator projecting perpendicularly from the first display face;

the second indicator having a second display face with a second display, with a second projection area of the second display face of the second indicator projecting perpendicularly from the second display face;

wherein the indicator support holder includes an upper indicator support area supporting the second indicator, a lower indicator support area supporting the first indicator at a location which is horizontally offset from said upper indicator support area, and a pole connection area for connecting the indicator support holder to an indicator holder support shaft, wherein the upper indicator support area, the lower indicator support area and the pole connection area are integral, wherein the indicator support holder supports the first indicator and the second indicator such that the first projection area and the second projection area do not overlap and neither the first indicator nor the second indicator obscures either the first display or the second display.

13. The label vacuum-grip cylinder calibration system of claim 12, wherein:

the first display face and the second display face are parallel, but on different planes.

14. The label vacuum-grip cylinder calibration system of claim 12, wherein:

the first display and the second display are digital displays.

15. The label vacuum-grip cylinder calibration system of claim 12, wherein:

the first probe and the second probe are parallel, but nonlinear.

* * * * *